Sept. 30, 1969     L. W. SANDERSON     3,469,756
CONTROL ATTACHMENT FOR ROTATING SHAFT ROLLER TO
CONTROL THE MOVEMENT OF MATERIAL
Filed Feb. 19, 1968

*Inventor.*
LEONARD WATSON SANDERSON though the control attachment as shown in FIG-
United States Patent Office 3,469,756
Patented Sept. 30, 1969

3,469,756
CONTROL ATTACHMENT FOR ROTATING SHAFT ROLLER TO CONTROL THE MOVEMENT OF MATERIAL
Leonard Watson Sanderson, P.O. Box 164,
Toronto, Ontario, Canada
Filed Feb. 19, 1968, Ser. No. 706,424
Int. Cl. B65h 23/26
U.S. Cl. 226—177                              3 Claims

ABSTRACT OF THE DISCLOSURE

A mounting arrangement for a web material guide roll wherein two spaced plates at opposite ends of the roll support idler rollers which may be adjusted toward and away from the roller by means of screws threaded into the end of each plate.

---

This invention relates to attachments that control the movement of material over or under a rotating shaft roller, whether it be pliant, flexible or rigid.

The primary object of this invention is to provide a simplified control attachment for a rotating shaft roller to compel such material to move by tightening the screw in each of the guide plates after the material has been placed between the rotating shaft roller and the idler friction covered ball bearing rollers with their nuts tightened suitably.

Another object is to provide a control attachment for a rotating shaft roller that is easy to adjust, acts as a guide for the material and can be used with any length of rotating shaft roller to accommodate the desired width of material. In such instance the bent rod helping to support the guide plates would be lengthened or shortened accordingly. The attachment can be operated from the top, either side or at the bottom of the rotating shaft roller.

An additional feature of this invention is to provide the movement of material with only a small portion of its surface being under pressure from the idler friction covered ball bearing rollers during the operation.

A selected embodiment of the invention is shown in the accompanying drawings, in which.

Figure 1:
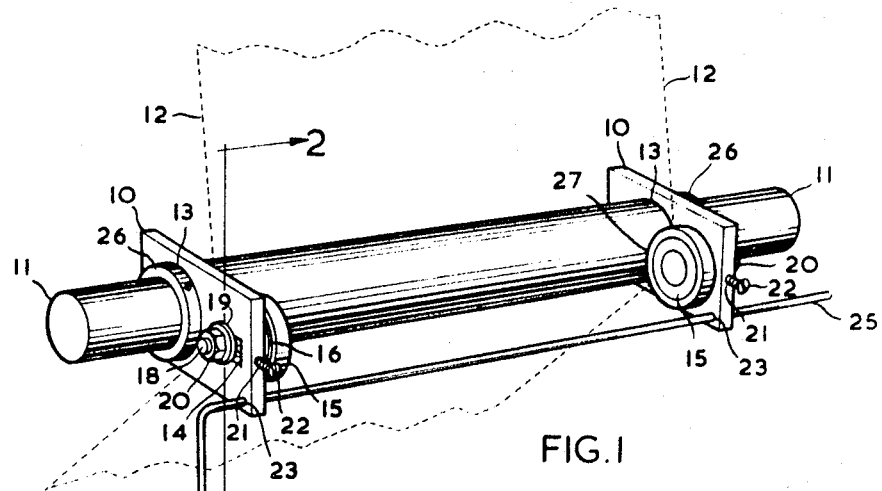
FIGURE 1 is a perspective view of the complete invention.
Figure 2:
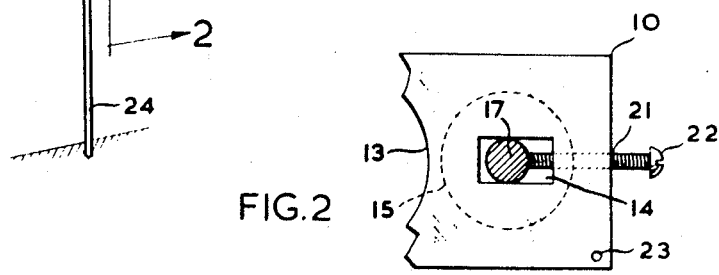
FIGURE 2 is a side elevation of item 10 cut on section line 2—2 in FIGURE 1.
Figure 3:
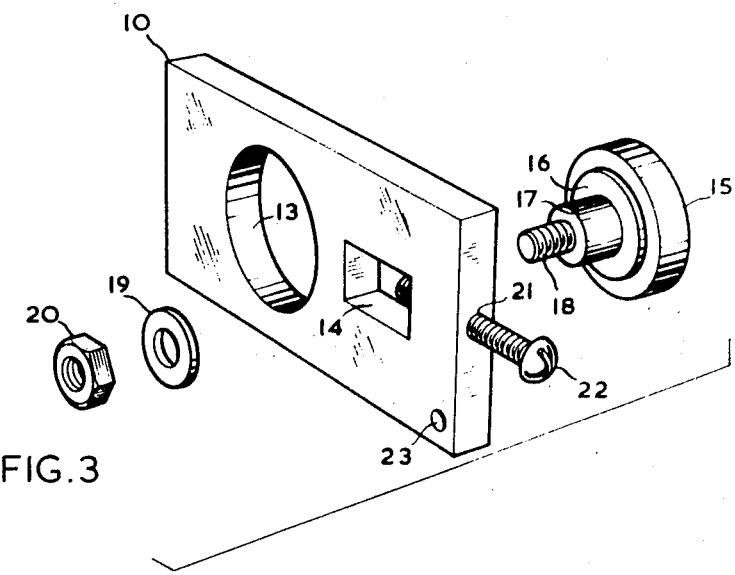
FIGURE 3 is an exploded view of idler roller 15 and guide plate 10.

Although the control attachment as shown in FIGURE 1 is being used with a horizontal rotating shaft roller, it must be understood that it is not to be restricted to this alone but could be used with a vertical rotating shaft roller if desired. Also the bent rod used in the guide plates could be changed to a straight rod if necessary for certain particular operation, and the holes for its insertion be in the upper or lower corners of the front of the guide plates.

It will also be understood how the ends of the bent rod are held in position by their designated location.

Item 15 idler friction covered ball bearing rollers will be referred to as idler rollers in the following specification in order to be concise.

This invention comprehends a pair of guide plates 10 each attached to the ends at the shoulder of the rotating shaft roller 11 which can be operated by any power means, with its ends less in diameter than the portion partly covered by material 12 and of which rest in pillow blocks or similar bearings. Said guide plates 10 have holes 13 that encircle the ends of the rotating shaft roller 11. Oblong spaces 14 hold the idler rollers 15 in position after insertion and when their nuts are tightened suitably.

The idler rollers 15 are inserted in the oblong spaces 14 of the guide plates 10 with them facing each other in the space between the guide plates 10. Flanges 16, studs 17, threaded shafts 18, washers 19, nuts 20, all are part of idler rollers 15. Flanges 16 enable the rollers to be idlers when their nuts are tightened.

Screws 22 go through the centre threaded holes 21 of the front ends of the guide plates 10 to be tightened and to control the pressure of the idler rollers 15 on material 12 and rotating shaft roller 11. Holes 23 in the bottom corner of the front of guide plates 10 hold the bent rod 24–25 when it is inserted through both guide plates 10.

The bent rod 24–25 extends through holes 23 of the guide plates 10 with one end 24 resting in a hole of a floor and the other end 25 fastened to a floor or wall brace for support. The bent rod 24–25 helps to support the guide plates 10 in proper position so idler rollers 15 are held securely and in alignment with the rotating shaft roller 11 during operation, and the material 12 has already been placed between them.

Collars 26 with set screws on the rotating shaft roller 11 are provided to hold the guide plates 10 in fixed position. Item 27 is the contact point where idler rollers 15 press against the surface of material 12 which rests on the rotating shaft roller 11.

The invention provides a practical and simplified control attachment for the rotating shaft roller to compel the movement of material. It is versatile and inexpensive to manufacture.

The embodiments of the invention in which an exclusive property or privilege is claimed are defined as follows:

1. A control attachment for a rotating shaft roller having a pair of guide plates, each with a circular hole near its end to permit both to encircle the ends of the rotating shaft roller to its shoulder when attached and be held to same by collars with set screws, said guide plates each having an oblong space to hold an idler friction covered ball bearing roller transversely in position suitably by the tightening of a washer and nut, said guide plates each containing a screw which passes through the front end centre threaded hole of each plate to control the pressure of the idler roller against the material and rotating shaft roller by its adjustment, said guide plates each containing a small circular hole in the lower front corner to accommodate a bent rod that passes through both plates for supporting benefit.

2. A control attachment for a rotating shaft roller as claimed in claim 1 in which said attachment includes two idler friction covered ball bearing rollers with means to be held in the guide plates such that their positions can be moved forward longitudinally by adjustment of screws in the guide plates and thereby cause pressure to be put on the material and rotating shaft roller to compel the movement of material that is placed between them.

3. A control attachment for a rotating shaft roller as claimed in claim 2 in which said attachment includes a bent rod that extends through both guide plates with one end resting in a hole of a floor and the other end fastened to a floor or wall brace to help support the guide plates in position whereby the idler friction covered ball bearing rollers are held securely and in alignment with the rotating shaft roller to compel the movement of material placed between them by adjustment of the screws.

References Cited

UNITED STATES PATENTS

| 3,017,061 | 1/1962 | Hobart et al. | 226—177 |
| 3,269,626 | 8/1966 | Albrecht | 266—177 |

ALLEN N. KNOWLES, Primary Examiner

U.S. Cl. X.R.

226—194